Figure 1:
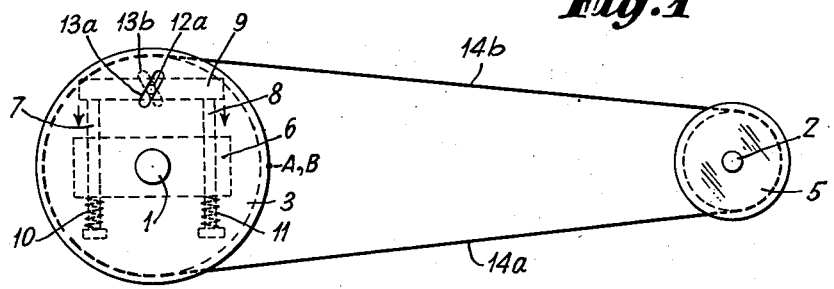

Aug. 27, 1940.   J. BULK   2,212,823

TENSIONING DEVICE FOR CORD DRIVE

Filed March 11, 1939

INVENTOR
JAN BULK
BY
ATTORNEY

Patented Aug. 27, 1940

2,212,823

UNITED STATES PATENT OFFICE 2,212,823

TENSIONING DEVICE FOR CORD DRIVE

Jan Bulk, Eindhoven, Netherlands, assignor, by mesne assignments, to Radio Corporation of America, New York, N. Y., a corporation of Delaware Application March 11, 1939, Serial No. 261,283
In the Netherlands August 20, 1938

3 Claims. (Cl. 74—242.8)

The transmission of a rotary motion from one shaft to another, for example in radio-apparatus, may be effected with the aid of a cord or rope. This transmission has the advantage of being very simple and cheap but it exhibits the drawback that in those cases wherein a very accurate transmission without any play is desired it does not function with sufficient accuracy. The stretch in the rope always gives rise to inconveniences. For this purpose various tightening devices have previously been proposed which generally make the transmission so complicated that they cannot receive consideration for use on a large scale as, for example, in the construction of apparatus.

The present invention relates to such a rope drive with a tensioning or tightening device which does not have these drawbacks.

The transmission according to the invention exhibits the feature that one of the shafts has rigidly mounted on it a drum over which passes the rope. The two strips of this rope are attached to two drums which are mounted on the other shaft, preferably the driven shaft, so as to be slightly rotatable. By a member subject to the action of a spring and non-rotatably mounted on the latter shaft, these drums are kept rotated relatively to one another in such manner that the rope is kept taut whilst in addition the member so mounted on the shaft that it cannot rotate relatively to the latter transmits the rotary motion of the drums to the shaft, the construction being such that the couple acting on the shaft of the tightening mechanism, which couple is due to the frictional force in this mechanism, exceeds the greatest couple acting on this shaft which is produced by the tractive force in the rope.

In one mode of execution of the transmission according to the invention, the two drums mounted on the one shaft are each provided with a slot. These slots extend obliquely in opposite directions and are engaged by a pin which is substantially located between the drums and which is immovable with respect to the shaft in the direction of rotation but is movable in the radial direction, said pin being subject to the action of a spring.

Another form of construction of the transmission according to the invention is characterized in that the two drums mounted on the one shaft are provided with an aperture which is engaged, with some clearance, by the ends of a pin provided on a resilient plate which is mounted on the shaft so as to be immovable in the direction of rotation and which possesses a preliminary tension such that in the case of elongation or play in the rope the surface of the plate slightly springs back with the result that the pin is shifted and thus the drums are displaced relatively to one another.

The invention will be explained more fully with reference to the accompanying drawing.

Figure 2:
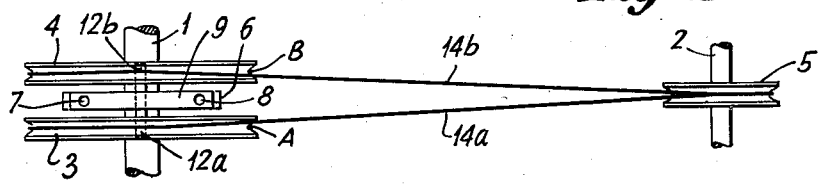

Figs. 1 and 2 represent a side-view and a plan-view respectively of one form of construction of the rope drive according to the invention provided with a tightening device.

In this form of construction there is a rope transmission between shafts 1 and 2. A rope 14 passes over a rope-pulley 5 which is rigidly mounted on the driving shaft 2. The two strips of this rope are each attached to one of the drums 3 and 4 which are rotatably mounted on the driven shaft 1. In the position shown the rope strip 14a embraces the drum 3 through an angle of about 270° and is attached to the drum at A whereas the rope strip 14b, which likewise embraces the drum 4 in this position through an angle of about 270°, is attached to the drum 4 at B.

The shaft 1 has furthermore mounted on it a bridge piece 6 which cannot be rotated with respect to the shaft and which is pierced with holes at its ends. Through the holes thus formed pass rods 7 and 8 which are connected to one another by means of another bridge piece 9 which carries a pin 12 extending parallel to the shaft 1. In the position shown in Fig. 1 the rods 7 and 8 are drawn in the direction of the arrows by helical springs 10 and 11 which are mounted, with a certain preliminary tension, between the bridge piece 6 and bosses on the rods 7 and 8. In the drums 3 and 4 there are provided slots 13a and 13b which extend obliquely in opposite directions and which are engaged by the ends 12a and 12b of the pin 12.

When the rope 14, which was initially tightly stretched between the drums 3 and 4 on the one hand and the drum 5 on the other hand and thus formed a transmission without any play between the shafts 1 and 2, exhibits after some time a certain amount of play, for example due to elongation or to wear and tear, the tightening device compensates the play in the following manner. Due to the action of the springs 10 and 11 a pull directed towards the shaft 1 is constantly exerted on the pin 12, owing to which the ends 12a and 12b of this pin exert a pressure on the side-faces of the slots in the drums. On account of the opposite directions of the slots in the two drums, this pressure is oppositely directed for the two drums. As a result of this pressure and of the friction thus produced, the drums are rotated relatively to one another with the result that the play in the rope is eliminated. It should be noted that the rotary motion of the drums, which are themselves rotatably mounted on the shaft 1, is transmitted by the pin 12 to the shaft 1 since this pin is connected, by means of the bridge piece 9 and the rods 7 and 8, to the bridge piece 6 which is non-rotatably mounted on the shaft 1.

Figure 3:
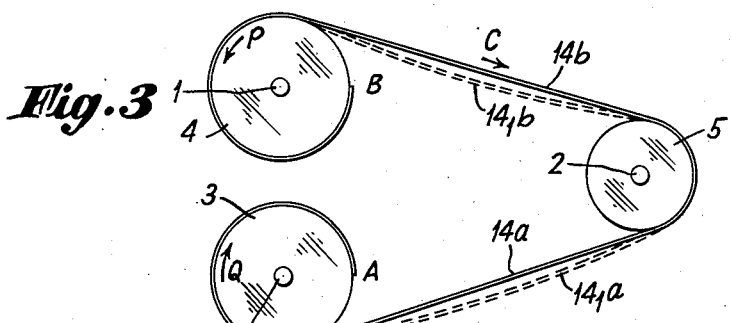

Fig. 3 shows diagrammatically the operation of the device according to Figs. 1 and 2. For clearness the drums 3 and 4 are shown above one another. When the rope is tightly stretched between the drum 5 on the one hand and the drums 3 and 4 on the other hand, the strips extend as indicated by 14a and 14b. If in course of time there is produced a certain elongation of the strips, the latter acquire the shape indicated by 14a and 14b. The forces exerted by the tightening mechanism on the drums 3 and 4, which forces are indicated by the arrows P and Q, must be capable of rotating the drums 3 and 4 relatively to one another in such manner that the amount of play is eliminated and the rope is tightened again. The forces P and Q exert on these drums a certain couple which must exceed the greatest coupling acting on the shaft 1 which is caused by the tractive force C acting in the rope 14. If such were not the case, the tractive force C would annihilate the action of the tightening mechanism: upon setting the shaft 2 in motion the force C would pull loose the tightening device before the shaft would follow the rotary motion.

Figure 4:
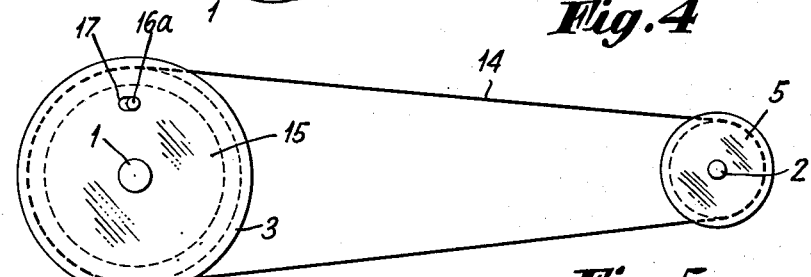
Figure 5:
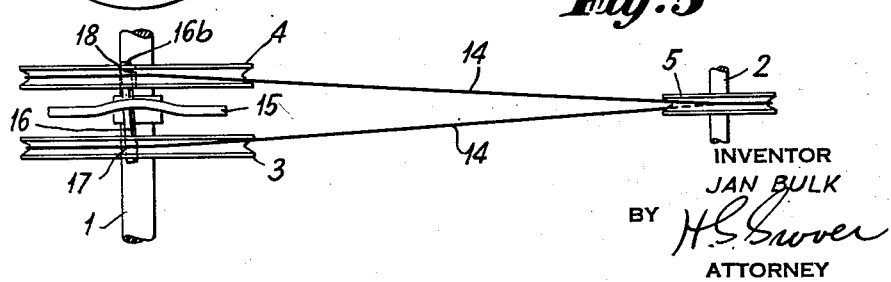

This fundamentally applies also to the device shown in Figs. 4 and 5.

Figs. 4 and 5 represent a side-view and a plane-view of another form of construction wherein, as in Figs. 1 and 2, the shaft has mounted on it a rope-pulley 5 over which a rope 14 passes freely. In a similar manner as in the preceding figures, this rope is secured to the drums 3 and 4 which are loosely mounted on the shaft 1. A resilient plate 15 is rigidly mounted on the shaft 1 between the drums 3 and 4. This plate carries a pin 16 whose ends 16a and 16b pass through apertures 17 and 18 in the drums 3 and 4. These apertures are slightly larger than the diameter of the ends 16a and 16b of the pin. As shown in Fig. 5, the resilient plate 15 possesses a certain amount of preliminary tension so that its surface is slightly curved. For clearness this curvature is shown in the figure greatly enlarged. If after a pause of some time the rope 14 exhibits a certain amount of play, due to which the transmission between the shafts 1 and 2 would no longer be completely free from play, the surface of the plate 15 is slightly displaced with the result that the angle $a$ between the projections of the centre-line of the pin 16 and the centre-line of the shaft 1 slightly increases, owing to which the drums 3 and 4 perform a relative rotation and the rope is tightened.

I claim:

1. A flexible cable transmission mechanism comprising a flexible cable means, a pair of pulleys mounted to rotate on the same axis in the same direction and adapted to be relatively rotated in opposite directions, said cable means having two ends, one secured to one pulley and the other to the other pulley, said pulleys each having a slot which extends obliquely, the two slots extending in opposite directions and disposed opposite each other, a member engaging said slots, and spring means tending to urge the slot engaging member towards the pulley axis.

2. A flexible cable transmission mechanism comprising driving and driven shafts, a pulley mounted to rotate with the driving shaft, a pair of pulleys loosely mounted on the driven shaft, a flexible cable means having its intermediate portion entrained about the driving pulley and its two ends each secured to one of the pair of pulleys, and means serving both to couple said pair of pulleys to the driven shaft and to maintain the flexible cable under tension comprising a member affixed to the driven shaft, and spring pressed means carried by said member and adapted to engage the pair of pulleys in a manner to permit relative motion therebetween.

3. A flexible cable transmission mechanism comprising driving and driven shafts, a pulley mounted to rotate with the driving shaft, a pair of pulleys loosely mounted on the driven shaft side by side and in spaced relation, said pair of pulleys each having a non-radial slot, which slots extend in opposite directions and are disposed opposite each other, a member affixed to the driven shaft and disposed between said pair of pulleys, a pin carried by said member engaging the slots of said pulleys, spring means for urging said pin in a radial direction towards the pulley axis, and a flexible cable having its intermediate portion entrained about the driving pulley and its free ends each secured to one of the pair of pulleys, the arrangement being such that the flexible cable is always maintained under tension, said cable tensioning means also serving as the coupling medium between the pair of pulleys and the driven shaft.

JAN BULK.